May 14, 1963
J. PUCKETT
3,089,721
RAZOR CLAM DIGGER
Filed Dec. 30, 1960
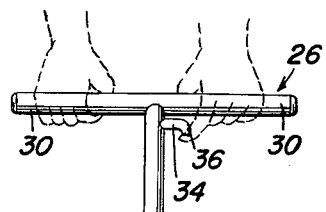
Fig. 1
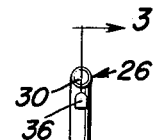
Fig. 2
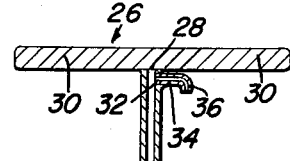
Fig. 3
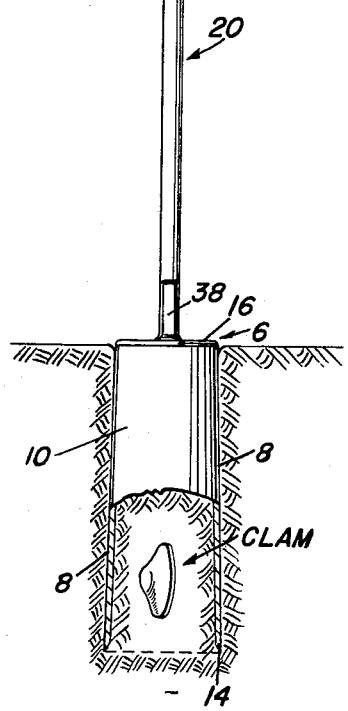
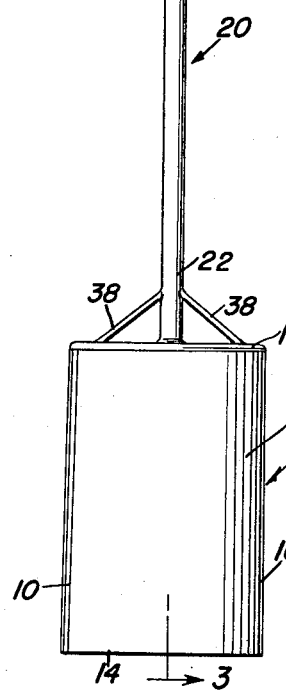
Fig. 4
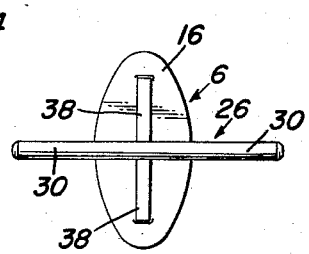
Fig. 5
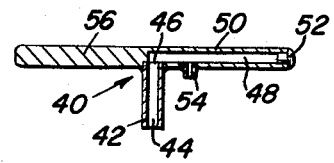
John Puckett
INVENTOR.
BY *Clarence A. O'Brien*
*and Harvey B. Jacobson*
Attorneys

3,089,721
RAZOR CLAM DIGGER
John Puckett, Olympia, Wash., assignor of one-half to Glenn Courtney, Olympia, Wash.
Filed Dec. 30, 1960, Ser. No. 79,882
6 Claims. (Cl. 294—50.7)

This invention relates to an improved manually usable clam digger which is expressly, but not necessarily, constructed and adapted to be used by inexperienced but enthusiastic clam-digging tourists and others in the category of interested but amateur clam diggers.

Persons conversant with this line of endeavor are aware of the fact that certain states impose varying law requirements on clam digging activities. Certain clam digging problems and prerequisites are briefly revealed in the Batstone Patent 2,802,689 and need not be reinterated here. However, and for general information it is suggested that the reader, in order to better grasp the nature of the present invention, refer to and familiarize himself with the Batstone patent. Having done so, it will be evident that an object of the instant matter is to improve upon Batstone's clam digger.

To the end stated it will be noted that the herein disclosed digger is such in construction and design that it more satisfactorily lends itself to both beach and surf digging requirements. Because of its unique construction it has proved out to be suitable and practical and functions, with equal facility and efficiency, whether digging for clams showing on the beach or in the surf, as the case may be.

It is desirable, as experience has repeatedly shown, to obviate undue stooping and laborious crouching when digging for clams; so, for better handling and leverage control, an improved handle is provided. More particularly, the present invention offers a well balanced vertically elongated T-shaped handle which is vented and capable of ready and approved use. It follows that the only bending and stooping resorted to involves picking up the clam from the discharged sand load.

Further, instead of using a cylinder circular in cross-section, the trap or chamber here employed comprises a hollow shell or tube having a slightly flared open bottom or mouth and which is oval in cross-section. The shape and size herein utilized does not damage or kill the clam, or clams, during the digging step. Instead it functions to accommodatingly fit the shape and size of the clam.

In carrying out the instant invention an exhaust orifice is provided at the center of the top or upper closed end. The relatively long shank or stem of the T-handle is hollow and communicates with the orifice serving as an air passage in remotely located finger-controlled venting means. The hand-grips may be solid from end to end or alternatively at least one of the hand-grips may be hollow thus providing an extension of the passage, the same having an exhaust port and, if desired, a projecting finger-controlled nipple. This adaptation has proved out to be a successful solution of the venting problem while standing and using the implement. Alternatively, perhaps preferably, the venting means may be embodied in the upper part of the shank adjacent to the hand-grips, as will be hereinafter revealed.

More explicitly, a suitable L-shaped vent is herein employed and this feature constitutes an advance over the Batstone digger as can readily be understood in that the operator does not, when using the L-shaped down-pointing venting nipple, have to contend with the air forcing up sand or water in his face as the digger is being pushed down into the sand, as usually happens in using a type of digging device which has a nipple opening on the top end of the cylindrical sand chamber pointing upward and directly into the face of the operator.

Another improvement resides in the T-shaped handle construction wherein the vertically elongated shank comprises a simple pipe defining a hollow shank, the cross-head at its upper end having its median portion fixedly joined to the upper end of the pipe or shank and thus closing said upper end in a simple but practical manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation with a portion in section of a clam digger constructed in accordance with the principles of the present invention and showing the manner in which it is constructed and adapted to be used.

FIG. 2 is a view in side elevation and at right angles to FIG. 1.

FIG. 3 is a section on the vertical line 3—3 of FIG. 2, looking in the direction of the arrows.

FIG. 4 is a top plan view.

FIG. 5 is a fragmentary section showing a modified hand-grip with the vent incorporated therein.

With reference to FIGS. 1 to 4 inclusive the head of the digger, denoted generally by the numeral 6 has been successfully constructed from galvanized sheet metal, stainless steel, or equivalent sheet material. This head comprises a closed-top, open-bottom shell or tube and constitutes a sand chamber. It is substantially oval in cross-section and provides diametrically opposite side walls 8 and rounded transverse end walls 10. The hollow portion as stated defines the sand and clamp trapping chamber 12. It should be noted that the lower open end portion is slightly larger in cross-section than the upper end portion and is provided with a suitably beveled piloting and cutting edge 14. The upper end is closed by an appropriately attached ovate plate 16 having a centralized port or orifice 18. The aforementioned improved long handle is T-shaped, the stem or shank being some twenty-three inches more or less in length. The cross-section in practice is three-quarters of an inch and the handle as an entity is denoted by the numeral 20 and comprises a length of pipe or tubing constituting the shank or stem 22, the bore or passage which is denoted at 24. The upper cross-head of the T is denoted at 26 and has its median or central portion 28 fixedly joined to the upper end of the stem or tube and thus closes said upper end. The projecting end portions provide hand-grips 30.

It is believed to be unnecessary to state the precise material or exact dimensions employed in the construction herein under advisement. However, it may be stated that the upper or top end of the pipe or stem 22 has a three-eighths inch hole drilled therein as perhaps best shown at 32 in FIG. 3 which hole serves to accommodate the coacting long branch 34 of the L-shaped vent. The depending short branch of this L-vent is denoted at 36, these features 34 and 36 being located adjacent to the hand-grip depicted at the right say in FIGS. 1 and 3. In actual practice the hand-grips may be encased with removable rubber or plastic anti-slipping grips (not detailed). It is also to be noted that suitable braces 38 are provided, these being of appropriate flat-bar construction and diagonally arranged and joined at their upper ends to diametrically opposite sides of the pipe or tube 22 and having the lower ends joined to the transverse end portions of the top side of the plate 16.

The relatively small quantity of sand contained in the oval-shaped sand chamber results in a much lighter weighing full capacity load of sand which is more easily raised or lifted by the user for each completed digging operation than the other larger and heavier sand loads raised or lifted by present dimensional stovepipe types for each completed digging operation. Therefore, by obviating undue stooping together with the smaller quantity of sand (weight) to be lifted, persons of a wider age range (young and old) are able to successfully and more easily operate this improved digger.

Furthermore, during trial diggings using the herein disclosed oval-shaped sand chamber undamaged larger clams 5¾ inches in length by approximately 2½ inches in width, were dug. Therefore, this digger will dig the larger sized clams equally as efficiently and successfully as it will dig the smaller sized clams, which a 4 or 4½ inch diameter cylindrical shaped sand chamber will not do.

In order to operate the digger the user should stand facing the water. Then, center the digger over the clam hole and push the digger down rocking it back and forth while pushing downward until the sand chamber or tube has filled and until the digger can be pushed no further. Then place the forefinger over the downwardly facing exhaust terminal 36 and rock back and forth as the digger is lifted or raised out of the sand. Now release the sand from the chamber on the ground by lifting the forefinger from the covered exhaust nipple or terminal 36. The clam will be thus released or discharged with the sand intact.

If clams are down unusually deep (for beach digging only) it may be necessary to go down deeper into the same hole a second time. This, however, is seldom necessary, even for beach digging, and is never necessary for surf digging.

Each and every time after using the digger, always be sure to rinse the whole digger in clean water completely, both inside and outside. This digger is designed especially for razor clams, but will dig other clams, too. Experience has shown that a user should not attempt to dig clams in rocks or coarse gravel.

It is reiterated that it is of importance to note the feature of the construction wherein an open-ended length of pipe is used as a suitable shank portion of a T-shaped handle, the upper end of the bore or passage thereof being closed by the intermediate portion 28 of the cross-head, the latter providing handgrips 30 in a manner detailed in FIGS. 1 and 3 in particular.

It is within the purview of the invention to provide a simple hole in the upper end of the stem just beneath the cooperating grips 30 to either left or right to that shown in FIG. 3 and to utilize this hole, in lieu of the L-shaped member, as an appropriate vent.

It is also within the purview of the invention to utilize the type of handle shown in FIG. 5 wherein the T-shaped handle is denoted at 40, the pipe or stem being indicated at 42 and the passage at 44, said passage communicating at its upper end 46 with a hollow portion 48 in the hand-grip 50 the outer end of the grip being closed by a suitable plug 52. In this construction the opening providing the vent is in turn provided with a depending venting nipple 54. The other hand-grip to the left in FIG. 5 is solid as indicated at 56.

Further attention is directed to the downwardly tapering hollow shell constituting a convenient and practical digging head and trapping chamber, it being noted that the lower end is increased in cross-section to facilitate pressing or forcing the knife-like edge 14 into the sand at the selected spot.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use while facing the surf and digging on the beach, or alternatively, in the surf, a clam digger comprising: a hollow shell vertically elongated ovate in a plane at right angles to the vertical axis of said shell, said shell being open and provided with an endless cutting edge at its bottom and being closed at its top except for an axially centered orifice, the hollow portion of said shell defining and providing a sand and embedded clam trapping chamber, a T-shaped handle embodying an elongated shank having its lower end rigidly joined to a central portion of said closed upper end, and a crosshead at right angles to and centrally joined to the upper end of said shank and providing hand-grips, said shank being amply long considered in conjunction with the shell to, in this manner, obviate the necessity of stooping and crouching when using the digger, one of said hand-grips being hollow, said hollow grip having an underneath side provided with an exhaust port and being further provided with a downwardly disposed finger controlled nipple registering with said port, said shank being hollow and providing an open-ended passage, a lower end of said passage being registrable with the aforementioned exhaust orifice and communicating with said chamber, the upper end of said passage registering communicably with an end of the hollow portion in the aforementioned hollow hand-grip.

2. A manually usable clam digger for use while digging on the beach or alternatively, digging in the surf comprising: a hollow shell vertically elongated and ovate in cross-section, said shell being open and provided with an endless cutting edge at its bottom and being closed at its top except for an axially centered air exhausting orifice, the hollow portion of said shell defining and providing a sand and embedded clam trapping chamber, a T-shaped handle embodying an elongated shank of a length approximately twice the length of said shell, said shank having its lower distal end integrally joined to a central portion of said closed upper end in communicating alignment with said orifice, and a cross head at right angles to and joined to the upper end of said shank and providing diametrically opposite outstanding hand-grips, said shank being relatively long and in conjunction with said shell functioning to obviate, when in use, the necessity of stooping and crouching, said shank being hollow and providing an air passage the lower end of said air passage communicating with said chamber by way of the exhaust orifice, the upper end of said passage being covered and closed by that portion of said hand-grip bridging and joined to said shank, said shank being provided adjacent to said hand-grip with a venting hole, said shank being further provided with a lateral outstanding finger controlled L-shaped venting member having a long branch adjacent and parallel to an underneath side of one of said hand-grips and joined at one end to the shank and communicable with said venting hole, the other end of said long branch terminating in a relatively short branch also located in a position adjacent to and directed downwardly and terminating adjacent said one hand-grip whereby the end of said short branch may be opened and closed at will by a finger of that hand which embraces said one hand-grip.

3. The structure in claim 1 and wherein the lower end of said shank is provided with diametrically opposite outstanding diagonal braces, the inner ends of said braces being connected to said shank and the outer ends being connected to said closed top, said crosshead being of a length greater than the ovate cross-section of the shell, whereby to assist the user in orienting himself and the component parts of the digger in relating his position of use relative to the surf.

4. A clam digger expressly designed and adapted for use while facing the surf and appropriate for digging on the beach as well as in the surf comprising: a hollow vertically elongated shell embodying a pair of diametrically opposit vertical side walls having their lengthwise portions joined by vertical end walls, the body portion of said shell being closed at its upper end, wholly open at its lower end and of a length that it may be forcibly pressed and completely embedded in the beach, the body portion of said shell being substantially ovate in top and bottom plan, the major axis of said body portion in a plane at right angles to the longitudinal axis being of a length less than the vertical length thereof, the hollow portion of said shell defining a trapping chamber, a rigid handle T-shaped in elevation and embodying a vertically elongated shank and a relatively short horizontal crosshead providing a pair of handgrips, said shank being of a length greater than the length of said shell and amply long that it in conjunction with said shell permits the user to utilize the digger in a stand-up position, the lower end of said shank being physically connected with an axial portion of the closed end of said shell, said T-shaped handle permitting the user to bodily rock the shell backward and forward during the time it is being forcibly shoved into the beach and, alternatively, when it is being withdrawn, and elongated passage means communicable with the chamber in a manner to vent the chamber at will, said passage means embodying a remote controlled air exhaust port situated in proximity to at least one of the handgrips, facing downwardly and being readily openable and closable by a finger of that hand which is applied to said one handgrip.

5. The structure defined in claim 4 and wherein said shell tapers gradually upward from said lower end to said upper closed end, and said shank is of a length approximately twice the vertical length of said shell.

6. The structure defined in claim 4 and wherein said shell tapers gradually upward from said lower end to said upper closed end, said shank being of a length approximately twice the vertical length of said shell, said crosshead being of a length greater than the length of the minor axis of the ovate body portion of said shell and having its outer end portions projecting to positions beyond said side walls in a manner to assist the user in orienting himself and the digger in respect to the aforementioned surf-facing position of use.

References Cited in the file of this patent

UNITED STATES PATENTS

| | | |
|---|---|---|
| 411,285 | Gray et al. | Sept. 17, 1889 |
| 785,742 | Lipps | Mar. 28, 1905 |
| 2,802,689 | Batstone | Aug. 13, 1957 |

FOREIGN PATENTS

| | | |
|---|---|---|
| 128,853 | Great Britain | July 3, 1919 |
| 296,139 | Great Britain | Aug. 30, 1928 |
| 865,902 | Great Britain | Apr. 19, 1961 |